March 24, 1936.  W. F. STAGGERS  2,034,841
SAFETY HITCH
Filed Nov. 15, 1934  4 Sheets-Sheet 1

Inventor
William F. Staggers
by Lester Sargent
Atty.

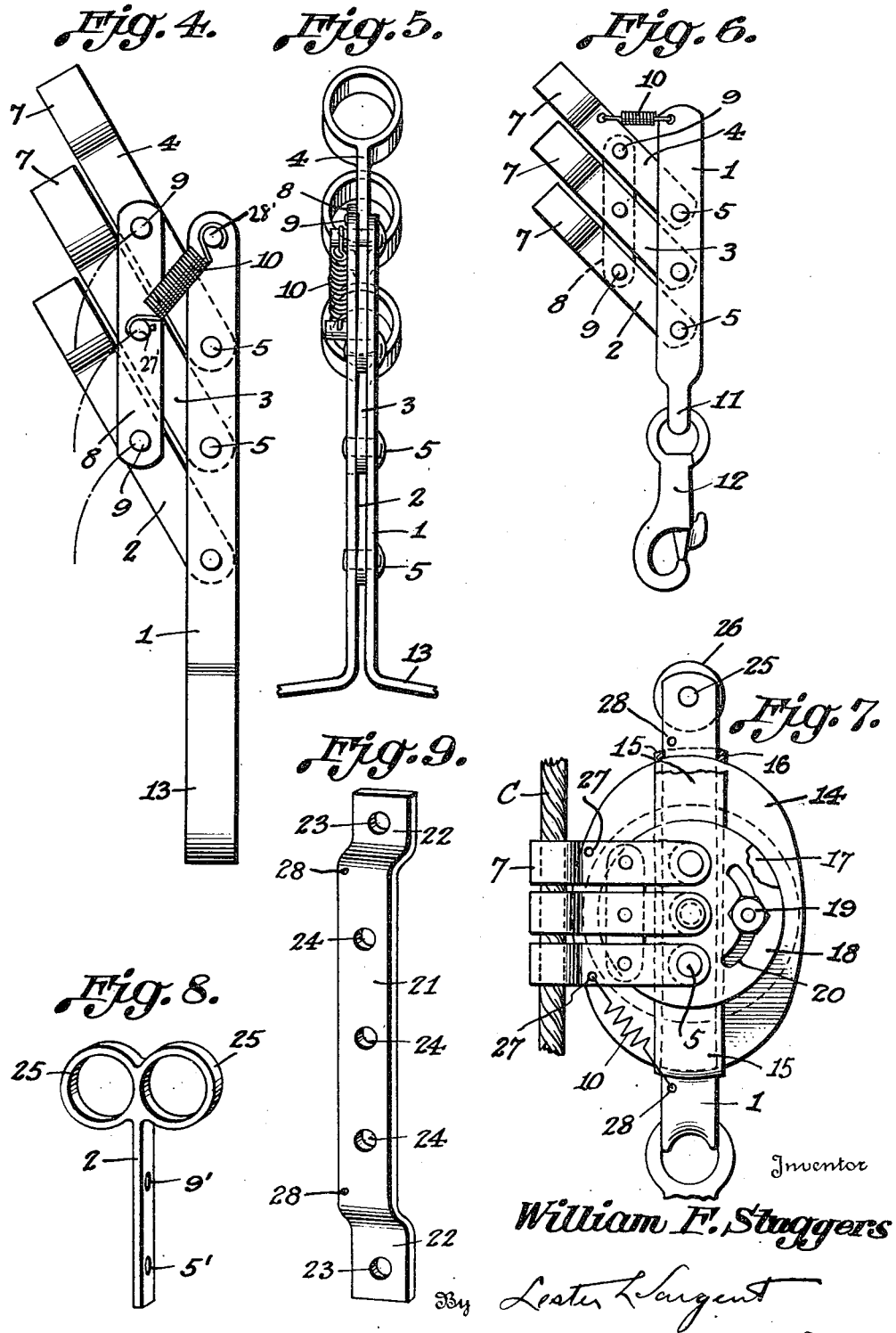

March 24, 1936. W. F. STAGGERS 2,034,841
SAFETY HITCH
Filed Nov. 15, 1934 4 Sheets-Sheet 3

Inventor:
William F. Staggers
by Lester L. Sargent
Atty.

March 24, 1936.    W. F. STAGGERS    2,034,841
SAFETY HITCH
Filed Nov. 15, 1934    4 Sheets-Sheet 4
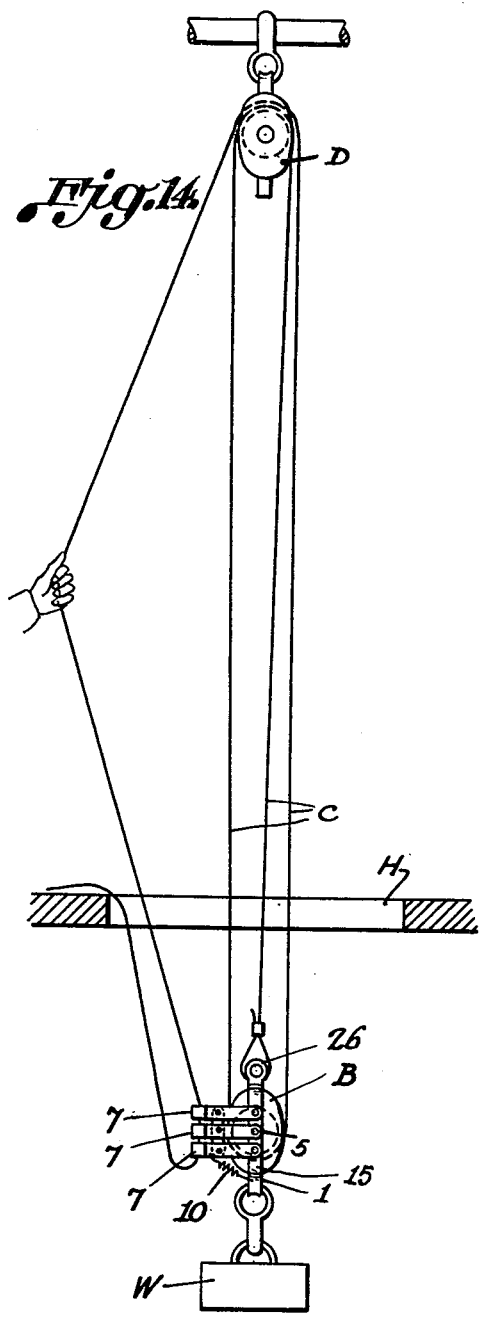
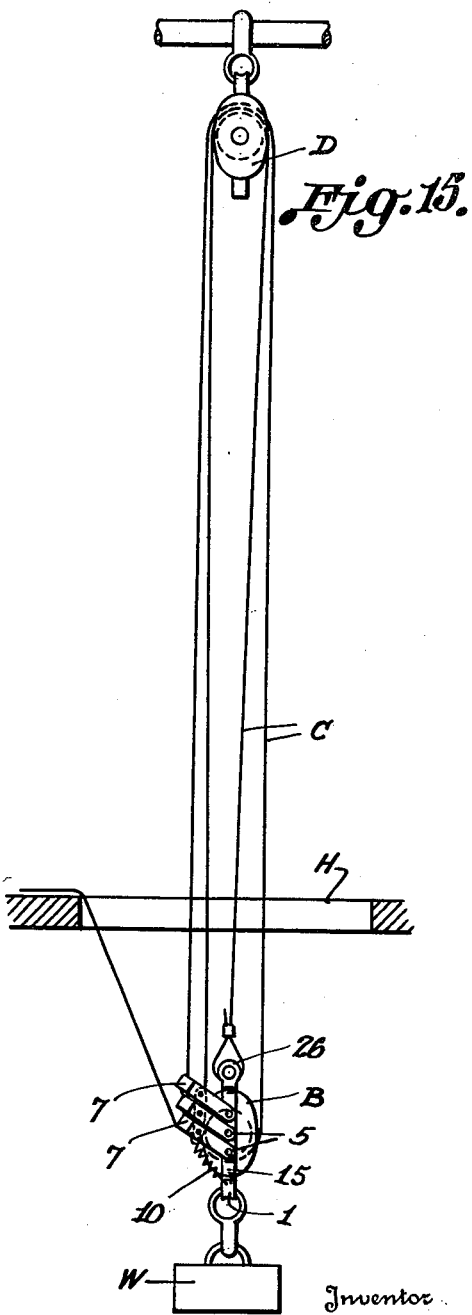
Inventor
William F. Staggers
By Lester L. Sargent
Attorney Patented Mar. 24, 1936

2,034,841

UNITED STATES PATENT OFFICE 2,034,841

SAFETY HITCH

William F. Staggers, Mannington, W. Va.

Application November 15, 1934, Serial No. 753,218

10 Claims. (Cl. 24—132)

The main object of my invention is to do away with the formerly man-made hitch which has been the cause of many lives being lost and of many accidents by reason of not being able to secure a safe hitch on cables to hold blocks in their position in scaffold painting, since there has been no other way to hold the block stationary only to take a claw hitch with the running line on the hook that holds the scaffold board. A great many times the hook is not large enough to hold the line in a safe manner, and it has been a great source of worry to men engaged in such work to know whether or not their helper has made a good hitch, especially when they are up 50 or 75 feet from the ground. It is the purpose of my invention to provide a permanent hitch at all times and all places, and adapted for all manner of work where men are compelled to use a secure hitch on a line.

The object of my invention is a safety hitch for all lines and purposes that a line may be used for, either a single line, double, or on blocks, and most particularly for scaffold work, where the fall line or running line is permitted to swing down on the street or sidewalk, and where some innocent party might tamper with it unaware of the danger they might do to the party who is on the scaffold. It is an object of my invention to provide a safety device which is attached to the block right at the hand of the operator and which cannot be released except by the hand of the person on the scaffold. It is a further object of my invention to provide a safety hitch which can be operated easily and safely in the manner hereinafter described.

It is a further object of my invention to provide a safety hitch which can be used on the top block as well as on the bottom block, in the manner illustrated and hereinafter described; and which may be readily adjusted.

It is also an object of my invention to provide a safety hitch device that can be used with a safety belt for men who are working on rigs, derricks, and high tension poles, such as electric work, and which can be adjusted to suit the operator, making it safe for him to work in dangerous places.

It is a further object of my invention to provide a permanent hitch for clothes lines and for securing ropes or lines in a tight position easily by a direct pull on the line.

I attain these and other objects of my invention by the mechanism illustrated in the accompanying drawings, in which—

Fig. 4 is a side elevation of a modification of the invention having a handle member to be grasped by the user;

Fig. 5 is an edge elevation of the form of the invention shown in Fig. 4, with most of the handle broken away;

Fig. 6 is a modification of the invention having an eye 11 in place of handle 13;

Fig. 7 is a side elevation of a modification of the invention mounted on a tackle and having means for adjusting the angle at which the safety hitch is disposed relative to the block;

Fig. 8 is a perspective view of a modification having a double loop 25;

Fig. 9 is a perspective view of a plate 21 used for attaching the device to a metal block;

Figure 1:
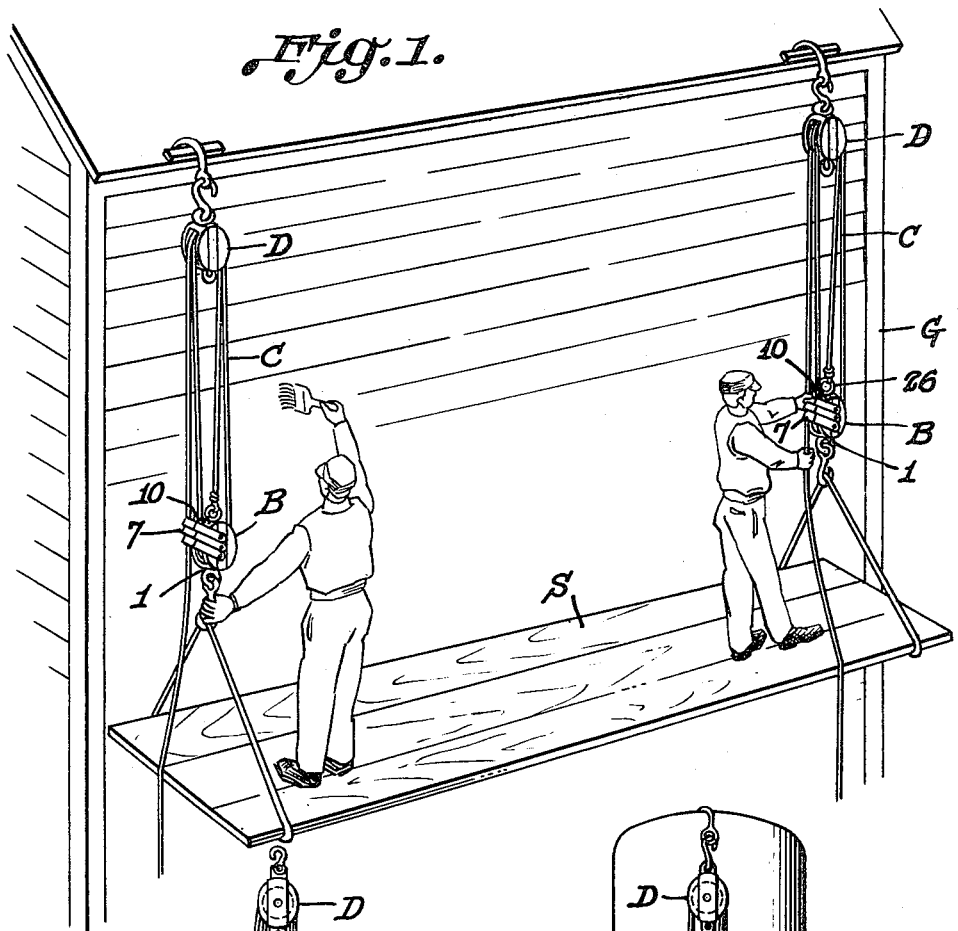
Figure 1 is a perspective view of my invention applied to the lower block of a block and tackle as used in hitching the cables by which a swinging scaffold is suspended for workmen, the spring 10 being attached to the upper end of self hitches 7.

Fig. 14 is a side elevation, partly in diagram, of the device applied to a block and tackle, the safety hitch being secured to the lower block for use where articles are to be lowered into a hatchway, the safety hitch being in position to allow the cable to slide freely, and spring 10 being fastened to the bottom of self hitches 7; and Fig. 15 is a similar view, but with the safety hitch in position to function as a brake or hitch on the cable.

Like numerals designate like parts in each of the several views.

Referring to the accompanying drawings, I provide a suitable base or bar 1 of any desired shape such as a metal strip, or in the form of a clevis, on which are pivotally mounted a series of metal strips, preferably three in number and designated as 2, 3, and 4. They are swingably mounted on member 1 by means of pivots 5 and are spaced apart an equal distance from each other as shown. They are secured in parallel relation to each other by means of a short bar 8, which is pivotally fastened to the respective strips 2, 3, and 4 by pivots 9. Each of the strips terminates in a loop 7 of suitable and like size to allow a cable C of any desired size to pass through same, the series of loops 7 functioning as hitches for the cable. I provide a spring 10 attached to either the upper or the lower portion of the hitches 7 and to the base or strip 1 to normally hold the hitches in either a position to allow the cable to slide freely therethrough, as in Fig. 7, or to effect a hitch on the cable, as in Figs. 1, 3, 4, 5, 6, and 15. In Fig. 7 it will be noted that the hitches 7 are held in a non-braking position by the spring 10 which is connected to the bottom hitch 7 as shown. In Figs. 1, 3, 4, 5, 6, and 14 the spring 10 is disposed to normally hold the hitches at an acute angle to the base or clevis 1 in a position to function as a hitch or brake on the cable C.

The base or clevis 1 may be provided with an eye 11 for securing it to a suitable spring hook 12 such as shown in Fig. 6; or the clevis 1 may have its U end enlarged to form the handle 13 of suitable size to be grasped in the hand where the device is to be used as a personal safety device.

When the device is used on a block, the clevis 1 is inserted longitudinally through the wood block 14 as shown in Fig. 7. I have devised an extension or U-shaped strip extending longitudinally of and partly around the block. This strip 15 has apertures 16 at each end through which one arm of the clevis 1 that passes through the wood block 14 is inserted. The pivoted metal strips 2, 3, 4 are pivotally mounted on strip 15 as shown in Fig. 7.

I have devised novel adjusting means for adjusting the angular position of the cable safety device relative to the block. For this purpose I prefer to attach a disc or plate 17 to the strip 15. Mounted adjustable on plate 17 is a second disc or plate 18 to which the strips 2, 3 and 4 are pivotally attached by suitable pivots 5. I may use any suitable adjusting means for adjusting the position of plate 18 and consequently of strips 2, 3, and 4 carried thereby, relative to plate 17 and the plane of the block 14. A suitable adjusting means illustrated in Fig. 7, consists of the bolt and nut 19 mounted in an aperture 20 in outer plate 18.

Figure 2:
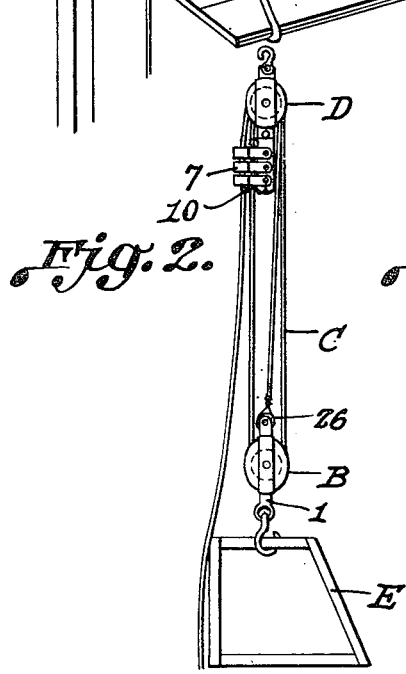
Fig. 2 is a side elevation of the invention applied to the top block, with spring 10 attached to the lower end of the self hitches 7.
Figure 3:
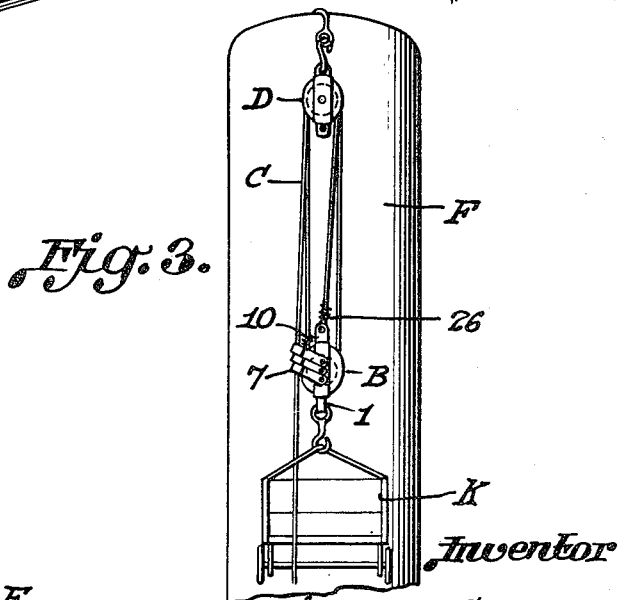
Fig. 3 is a side elevation of the invention applied to the lower block, the block and tackle being attached to a smoke stack, and the lower block carrying a swing or seat for a painter to sit in while painting the smoke stack, the spring 10 being connected with the upper end of the self hitches 7.

As shown in Fig. 7, I provide apertures 28 (or pins 28' as shown in Fig. 4) in the clevis, and apertures 27 (or pins 27' as shown in Fig. 4) in the strips 2 and 4, respectively, whereby a spring 10 may be engaged to one of the strips and to the clevis to normally hold the strips in a non-braking position as illustrated in Figs. 2 and 7; or whereby a similar spring 10 may be engaged to one of the strips and to the clevis to normally hold the strips 2, 3, and 4 in a braking position, as shown in Figs. 4, 5, and 6, according as the operator may desire to use the device. The free ends of clevis 1 engage the usual roller 26.

Referring to Fig. 9, there is illustrated a metal bar 21 which would be used in lieu of strip 15 and clevis 1 for attachment directly to the side of the block when a metal block is used instead of a wooden block. The offset ends 22 of bar 21 have apertures 23 for fastening the bar to the side of the metal block, and bar 21 has suitable openings 24 for pivots 5 by which strips 2, 3, and 4 are pivotally mounted on this bar.

Referring to Fig. 8, there is illustrated a modification of the invention in which the strips 2, 3, and 4 would be provided with a pair of eyes 25 in lieu of the single eye 7 shown in the other figures of the drawings. Strips 2, 3, and 4 have suitable apertures 9' and 5' respectively for the pivot members 5 and 9.

Figure 10:
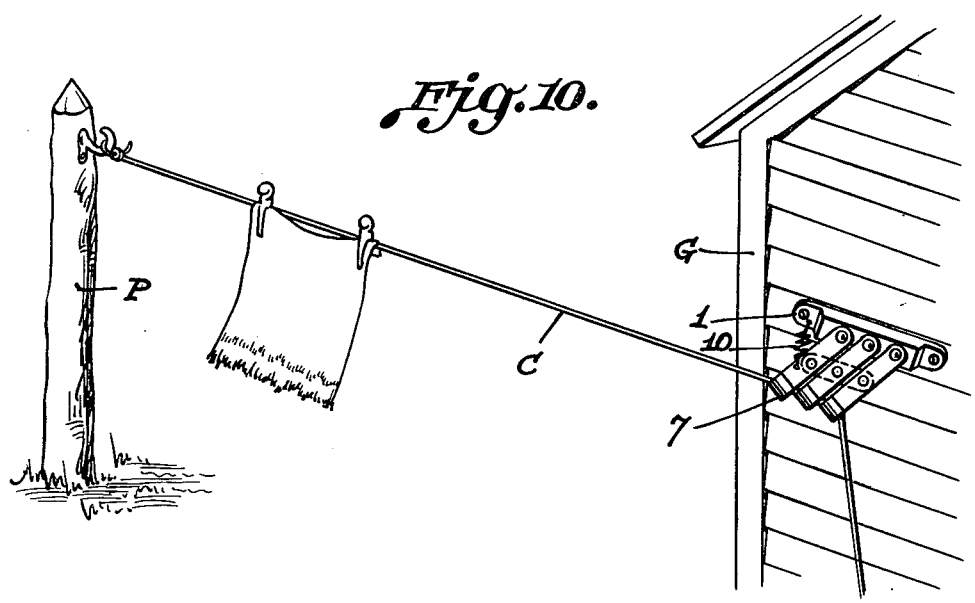
Fig. 10 is a perspective view of the device attached to a building and in operative position holding a clothesline.

Referring to Fig. 10, the invention is illustrated in use for holding a clothes-line C taut, one end of the line being fastened to a pole P, and the base 1 of the safety hitch being attached to the building G.

Figure 11:
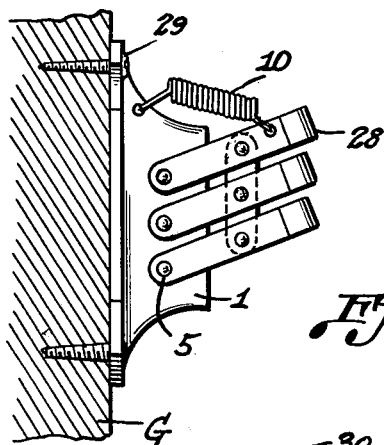
Fig. 11 is a side elevation of the invention having a base 1 of modified shape, in position attached to a building or other support.
Figure 12:
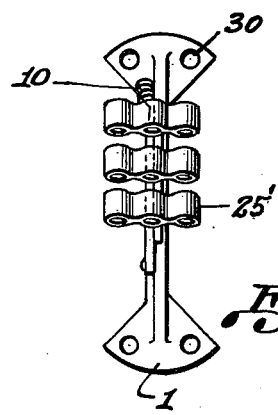
Fig. 12 is a front plan view of a modification for three cables, including a running line.
Figure 13:
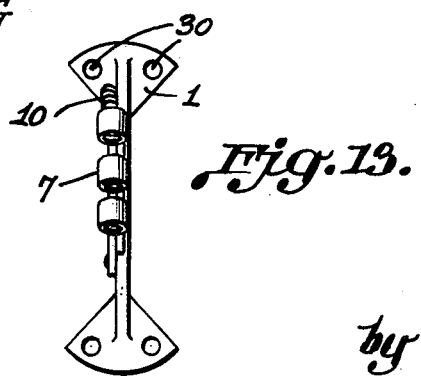
Fig. 13 is a front plan view of the form shown in Fig. 11.

Figs. 11 and 12 illustrate the safety hitch having a slightly modified form of base for convenient attachment to a building G and having a plurality of loops 25', and Fig. 13 illustrates the same style of base for a safety hitch 7 having single loops for a single cable.

Referring to Figs. 2 and 7 in which views the spring 10 is shown attached to the lower hitch 7, the hitches are normally held in a position at right angles to the direction of travel of the cable to allow it to slide freely through the loops or eyes of the hitches. The hitch can be operated in the case of handling a heavy load by swinging the fall line to a small angle so that the friction of the rope will pull it back to a locking or braking position as illustrated in Fig. 15. If the operator wishes to lower the load he can do so by taking the tension of the load from the safety hitch and holding the cable in a perpendicular position from the blocks without any extra line or attachment added to them in order to trip the safety device. The safety hitch may be used on the top block as well as on the bottom block and in order to do so the extension plate that is placed on the top block is extended down far enough to attach the three loops 7 that function as the safety hitch, so that the running line will run parallel through them on any ordinary angle of the fall line as illustrated in Fig. 2 of the drawings.

If on the other hand the spring 10 is arranged to hold the hitches in a position at an angle of approximately 45 degrees to the track of travel of the cable and of the plane in which the block is disposed, the hitches will normally function as a brake or hitch until released to a non-braking position by the hand of the operator, and can be released only by him, which makes it safe in all places. This is shown in Fig. 1, in the right hand portion of that figure, where the painter is about to operate the hitch to adjust his end of the swinging scaffold.

The form of the device illustrated in Fig. 6 can be attached to the belt of the user, leaving him free to do any and all the duties that may be required in a job in repairing electrical or structural work or in walking over a steep elevated roof. This same hitch device can be used with a safety belt for men who are working on rigs, derricks, and high tension piles, or can be adjusted as they desire, making their work safe in case of a slipping of the foot or other mishap. Likewise the device may be used advantageously on machinery where men are compelled to work in dangerous places such as on derricks and in the oil field.

As illustrated in Fig. 10, the device may be used as a permanent hitch for a clothesline as it simplifies stringing the line up tight, it being only necessary to give a direct pull to make it tight and then it is locked by the clutch of the safety hitch.

In the form of the invention shown in Fig. 8, two cables may be passed through the pair of eyes 25; and in the form of the invention illustrated in Figs. 11 and 12, three cables may be passed through the eyes 28.

What I claim is:

1. In a safety device of the type described, the combination of a base, a series of metal strips pivotally connected with the base and spaced a substantially equal distance from each other, each of said strips terminating in a loop to permit a cable to slide therethrough and to function as a hitch, a bar pivotally connected to each of the said strips and spaced from the base, and a spring attached to said hitch and to the base to resiliently hold the hitch members in a predetermined normal position relative to the base.

2. In a safety device of the type described, the combination of a clevis, a series of metal strips pivotally mounted on the clevis and spaced slightly apart from each other, each of said strips terminating in a loop, a bar pivotally connected to each of said strips and spaced from the clevis, and a spring attached to said pivotal members and to said clevis to resiliently hold the strips in a predetermined position relative to the clevis.

3. In a safety device of the type described, the combination of a bar, a series of metal strips pivotally connected to the said bar and spaced a substantially equal distance from each other in close proximity to each other, each of said strips terminating in a plurality of loops, a bar pivotally connected to each of the said strips and spaced from the first mentioned bar, and a spring attached to the respective bars to resiliently hold the strips in a predetermined position relative to the first mentioned bar.

4. In a safety device of the type described, the combination with a wooden block having a clevis extending through same, of an approximately U-shaped metal strip attached to the clevis, a series of metal strips pivotally mounted on said U-shaped strip, each of said series of strips having a loop at its outer end, a bar pivotally attached to each of said strips and holding same in spaced relation in proximity to each other, and a spring connected with one of the strips and with the clevis for holding the strips in a predetermined relation normally relative to the clevis and admitting of movement to a position to grip a cable passing through the loops of the aforesaid series of strips.

5. In a safety device of the type described, the combination of a block, a metal bar attached to and extending longitudinally of the block, a series of metal strips pivotally mounted on said bar, each of said strips having one or more loops at its free end of suitable size to receive a cable or cables, a bar pivotally attached to each of said strips and spaced from the first mentioned bar to permit of a limited range of swinging movement of said strips, a spring attached to one of the metal strips and to the first mentioned bar, and means for mounting the spring in either of two positions for holding the metal strips in either of two positions normally relative to the first mentioned bar.

6. In a safety device of the type described, the combination of a clevis, said clevis having a handle formed at its loop portion of suitable size to be grasped by the hand, a series of strips pivotally mounted on the clevis and spaced a like distance apart and in proximity to each other, a short bar pivotally attached to the aforesaid strips to cause them to move synchronously, a spring attached to the clevis and to one of the aforesaid pivotally moving elements to normally hold same at an angle of approximately 45 degrees relative to the plane of the clevis, each of the aforesaid strips having a loop at its free end for a rope or cable to slide through.

7. In a safety device of the type described, the combination of a clevis, a series of metal strips pivotally mounted on the clevis, a bar spaced from the clevis, and pivotally attached to the metal strips to keep same in a closely spaced relation to each other, each of said metal strips having a loop at its outer end to receive a cable, a spring attached to one of the strips and to the clevis to normally hold the series of strips in a predetermined position relative to the clevis to exert a braking action on a cable passing through the aforesaid loops, and a snap hook engaged by the loop of the clevis, whereby the device may be fastened to the belt of the user.

8. In a sfety device of the type described, the combination of a block, a metal bar extending longitudinally of and secured in a fixed relation to and on the block, a series of metal strips, each having a loop at its free end, a short bar pivotally attached to each of the metal strips holding them in a closely spaced relation throughout their range of movement, a plate on which each of said metal strips is pivotally mounted, means for securing said plate and strips in any of various adjusted positions relative to the longitudinal plane of the block, and a spring normally holding the strips in a predetermined position relative to the block.

9. In a safety device of the type described, the combination of a base, a series of metal strips pivotally mounted on the base and terminating in like loops, a short bar pivotally mounted to each of said strips to space same one from the other and in close proximity, and a spring resiliently securing said strips in a predetermined position relative to the base.

10. In a safety device of the type described, the combination of a block, a clevis extending longitudinally of the block and having an extension below the block, a series of metal strips pivotally mounted on said extension, each of said strips having like loops at its free end of suitable size for a cable of the desired size, a bar pivotally attached to each of said strips and spaced from the first mentioned bar to closely space the strips and permit of free swinging movement within a limited range, a spring attached to the lower portion of the aforesaid series of strips and to the extension on which they are pivotally mounted to normally hold them in a position at right angles to the plane of the extension and of the cable which passes through the loops of the pivoted strips.

WILLIAM F. STAGGERS.